United States Patent [19]
Giles

[11] 3,918,818

[45] Nov. 11, 1975

[54] METHOD FOR DETECTION OF TRICHINELLAE

[75] Inventor: Paul M. Giles, Los Alamos, N. Mex.

[73] Assignee: The United States of America as represented by the United States Energy Research and Development Administration, Washington, D.C.

[22] Filed: Mar. 29, 1974

[21] Appl. No.: 456,391

[52] U.S. Cl. .................. 356/239; 356/36; 356/164
[51] Int. Cl.² .................. G01N 21/16; G01N 21/32
[58] Field of Search ............ 356/36, 201, 164, 237, 356/239; 350/9, 90, 239; 353/39, 121, 122

[56] References Cited
UNITED STATES PATENTS
251,721   1/1882   Lomb et al. ...................... 350/239
3,205,770   9/1965   Kooh et al. ........................... 350/9

*Primary Examiner*—Vincent P. McGraw
*Attorney, Agent, or Firm*—Dean E. Carlson; Paul D. Gaetjens

[57] ABSTRACT

A process for rapid detection of trichinellae in samples of meat by compressing the said sample by means of a simple mechanical or hand press in a solution of glycerol or ethylene glycol, mounting the compressed sample between glass plates, and projecting this sample onto a standard projection screen.

4 Claims, 1 Drawing Figure

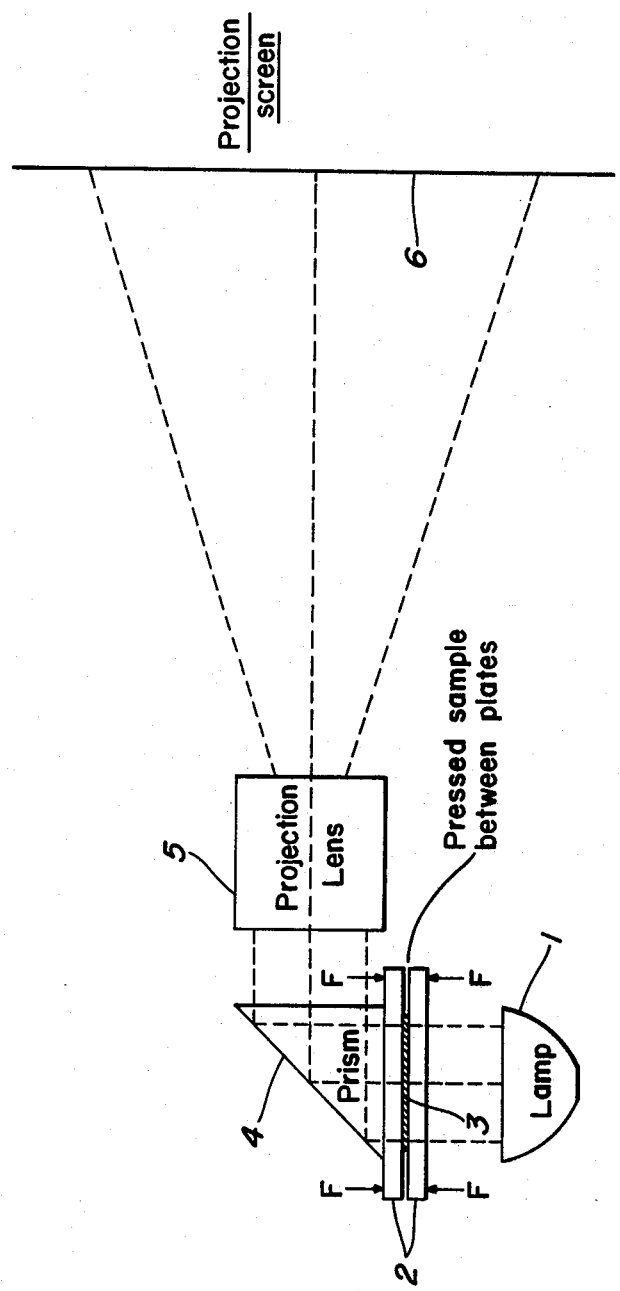

METHOD FOR DETECTION OF TRICHINELLAE

BACKGROUND OF THE INVENTION

1. Field of the Invention

This invention is concerned with a method of rapidly detecting trichinellae in meat samples and particularly with the detection of trichinellae or other infestants or lesions in meat.

2. Prior Art

Trichinoscopy constitutes the prior art. Trichinoscopy, even with projected field viewing, has been limited to microscopic field of view rather than whole-sample viewing. Prior-art enhancement of the specific infestant has not been demonstrated.

The usual staining techniques of the prior art for biological specimens were found to be both useless and inappropriate for discerning trichinellae within the time interval necessary for a production-line determination, that is, a matter of minutes. Although considerable effort by others has been expended to achieve greater enhancement of the lesions or cysts by staining, clearing by solvents and biological clearing agents, temperature control, and sample predrying, none of these methods which are old in the prior art have been found to be effective.

SUMMARY OF THE INVENTION

This invention is concerned with (1) suitable methods for processing and displaying pork meat samples, (2) distinguishing the trichinellae from the surrounding meat, (3) techniques for counting trichinellae, and (4) definition and refinement of processing methods.

I have developed a three-step process for rapid detection of trichinellae in 1–5 gram samples of pork meat comprising the following steps:

1. Compression of sample in glycerol or ethylene glycol,
2. Mounting of compressed sample between glass plates for projection, and
3. Optical projection of compressed sample on a suitable screen.

The projection method of this invention can be used on the production line of slaughterhouses to provide a visual "yes-no" decision within a range of 3–5 minutes at an estimated cost of fifteen cents per carcass. It is expected that further development of the mechanics of this method will allow both the time period and cost to be reduced.

The use of a projector to detect the trichinellae offers many advantages over the microscopy which was used in the prior art. The major advantage is that of whole-sample field of view. Another of the advantages is that a vertical, rigid screen such as white cardboard would allow the examiner of the meat to place reference marks in pencil as to the exact locations of the cysts containing the trichinellae, thus avoiding counting redundancy. Furthermore, the projection display technique has removed the evaluation or detection process from the drudgery of microscopy to a very comfortable, nonfatiguing sample visualization and study method.

The usual staining technique of the prior art for biological specimens was found to be useless and it is my discovery that the use of glycerol or ethylene glycol greatly enhances the refractive-index discontinuity of trichinellae to a degree which renders them distinctly visible when the meat sample is compressed and then projected by means of ordinary optical projection.

BRIEF DESCRIPTION OF THE FIGURE

The FIGURE is a schematic view of one configuration of apparatus which is used to perform the detection method of this invention.

DESCRIPTION OF THE PREFERRED EMBODIMENT

The manual configuration of the process is described: A simple press (not shown) is used for the controlled compression of the pork meat samples. These samples are about 1–5 gram in weight. In particular, the meat sample is wetted in glycerol and then placed in the press where it is subjected to a pressure of about 900–1,000 pounds force F per gram weight of sample. The pressed meat sample is removed from the press and placed between glycerol-coated glass slides in a 2 in. × 2 in. slide binder. The sample is projected as an ordinary transparency slide in a common optical slide projector, onto a suitable screen, preferably one of white cardboard. With the meat sample projected on the screen the trichinellae are clearly visible and defined and can be scanned or counted by either the human eye, television camera, or an appropriate photo cell (not shown).

I have further found that ethylene glycol may be substituted for the glycerol to achieve the same optical enhancement of the trichinellae.

The method of this invention is uncomplicated, noncritical, and fast. It lends itself easily to automation. With the trichinellae clearly defined on a projection screen there are at least two methods of identification or counting: (1) scanning by eye, and (2) television (automatic) scanning.

Scanning by eye can be evaluated by comparison with the trichiniscope method (microscope search and count). There are obvious advantages of operator comfort, projection size, clarity and contrast between trichinellae and background, whole sample availability, processing facility, and the spatial relationship of artifacts. These all suggest that for a positive sample of 5 grams or less, the glycerol-projection method is much faster than conventional trichiniscopy.

In a second embodiment as shown in the FIGURE, the pressprojector functions are combined in a single mechanical-optical arrangement. In the FIGURE, the meat sample 3, dipped in glycerol, is compressed between glass plates 2, illuminated by projection lamp 1, and optically projected through prism (or mirror) 4 and projection lens 5, onto viewing screen 6. By press retraction the glass plates are separated, the sample removed and the cycle may then be repeated.

What I claim is:

1. A process for rapid detection of trichinellae in meat samples comprising wetting said sample in an enhancing refractive-index fluid selected from the class consisting of glycerol and ethylene glycol, compressing the said sample in a press, mounting the compressed sample between glass slides coated with the said fluid, and projecting the sample's image by a projection means.

2. The process of claim 1 in which the compressing step involves subjecting the meat sample to a force of about 900 pounds per gram of sample.

3. The process of claim 1 in which the enhancement fluid is glycerol.

4. The process of claim 1 in which the enhancement fluid is ethylene glycol.

* * * * *